United States Patent [19]
Haller, Jr.

[11] Patent Number: 5,796,502
[45] Date of Patent: Aug. 18, 1998

[54] MULTIPLE INDEPENDENT/DEPENDENT MONOCHROMATIC LIGHT FREQUENCY FIBER OPTIC COMMUNICATION SYSTEM AND METHOD

[76] Inventor: John L. Haller, Jr., 7249 Carrizo Dr., La Jolla, Calif. 92037

[21] Appl. No.: 778,846

[22] Filed: Jan. 6, 1997

[51] Int. Cl.$^6$ .................................................. H04J 14/02
[52] U.S. Cl. .................... 359/124; 359/133; 359/173
[58] Field of Search ............................ 359/124, 127, 359/114, 133, 143, 164, 173

[56] References Cited

U.S. PATENT DOCUMENTS 5,224,183  6/1993  Dugan ................................ 359/124

FOREIGN PATENT DOCUMENTS 0438153  7/1991  European Pat. Off. ............ 359/124
0477699  4/1992  European Pat. Off. ............ 359/124

*Primary Examiner*—Kinfe-Michael Negash
*Attorney, Agent, or Firm*—Brown, Martin, Haller & McClain, LLP

[57] ABSTRACT

An optical fiber communication system has an optical fiber extending along a communication path between spaced stations. The stations include transmitting and receiving units, or combined transmitter and receiver units at each station. Each transmitter unit is designed to produce information signals on one or more different topics, and is associated with one light source for each topic of information assigned to that station. The light sources produce output light signals modulated by the information signals, and these light signals are coupled to the optical fiber. The light sources are of different frequencies, and each topic of information to be communicated is assigned to a predetermined light frequency, so that all light signals at a certain frequency carry only information on the one topic assigned to that frequency. Each receiver unit includes a filter for filtering out signals at one or more of the frequencies and a decoder for extracting the information from the filtered signal.

15 Claims, 2 Drawing Sheets

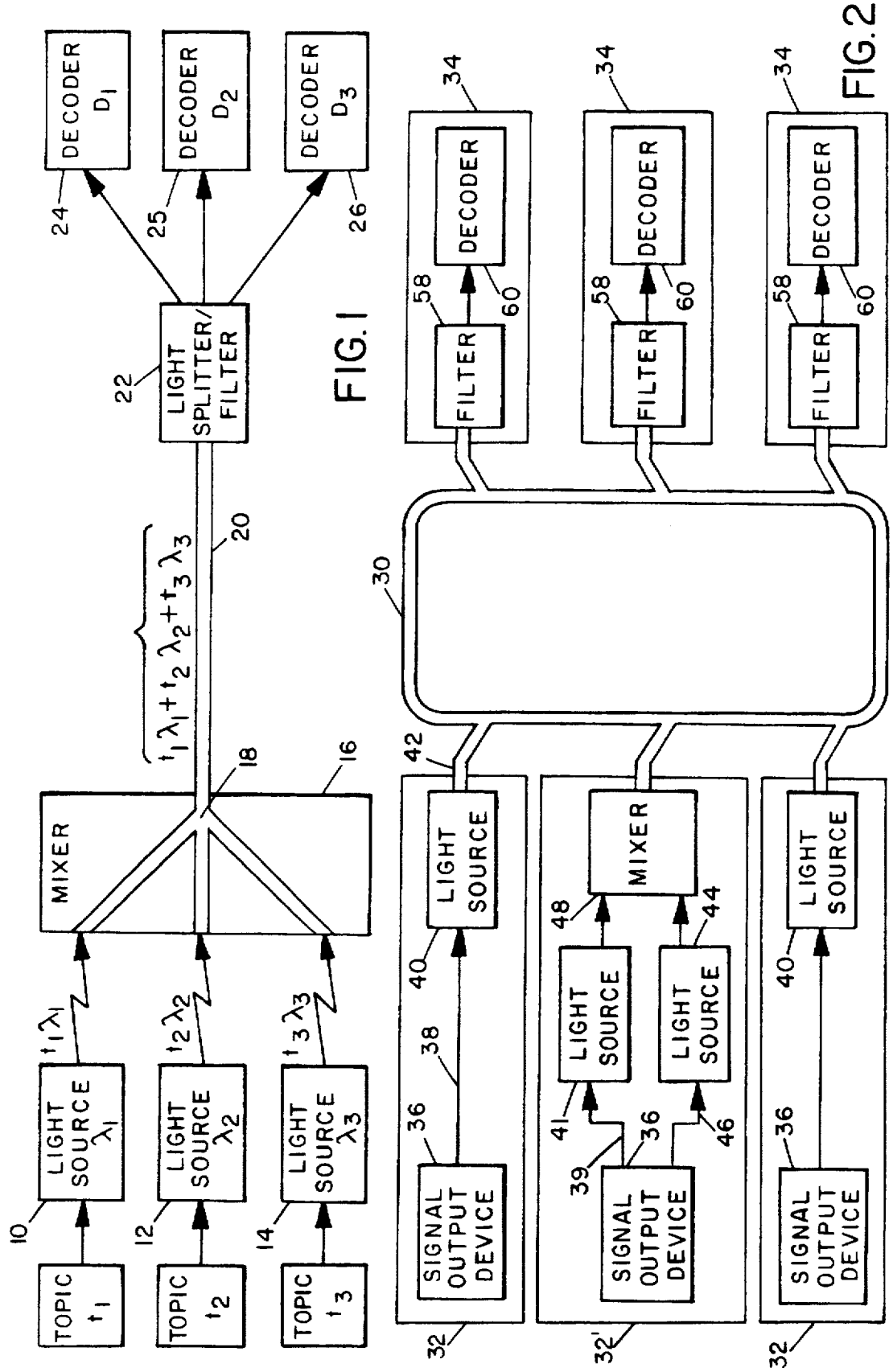

MULTIPLE INDEPENDENT/DEPENDENT MONOCHROMATIC LIGHT FREQUENCY FIBER OPTIC COMMUNICATION SYSTEM AND METHOD

BACKGROUND OF THE INVENTION

The present invention relates generally to fiber optic communications in which digital information is transmitted along one or more optical fibers between separate stations.

Fiber optic communication systems are often used in telecommunications, computer networks, and other areas. In such systems, an optical fiber carries one or more optical signals which are modulated by periodic signals carrying the digital information to be transmitted. The encoded light signal is transmitted along the fiber to a detector which decodes the information from the light signal. Optical fiber communicating links are described, for example, in U.S. Pat. Nos. 4,243,297 of Elion, 4,867,520 of Weidel, and U.S. Pat. No. 5,280,549 of Barnard et al..U.S. Pat. No. 4,725,128 of Bornzin et al. describes a method for delivering light from multiple light emitting diodes over a single optical fiber.

U.S. Pat. No. 4,243,297 of Elion describes an optical wavelength division multiplexer mixer/splitter for mixing and splitting various optical pathways where one or more separate optical signals are carried by a single optical fiber. U.S. Pat. No. 5,280,549 of Barnard et al. describes an optical isolator in which two signals are transmitted in opposite directions on a single optical fiber, and are isolated dependent on their frequencies.

U.S. Pat. No. 4,430,572 of Eve et al. describes a device for separating two light signals having different wavelengths traveling in a single optical fiber. The optical fiber terminates in two branched off portions, one of which has an extension of predetermined length. The propagation times in the two branched off portions will be different, and the difference will be dependent on the length of the extension as well as the different wavelengths, allowing the signals to be differentiated.

U.S. Pat. No. 4,770,485 of Buckley et al. describes an apparatus for launching angularly separated mode groups into a light guide such as an optical fiber.

SUMMARY OF THE INVENTION

It is an object of the present invention to provide a new and improved optical fiber communication system and method.

According to one aspect of the present invention, the independent mode, an optical fiber communication system is provided which comprises at least one optical fiber extending over a desired communication path between separate or remote stations, a plurality of spaced stations each linked to the optical fiber for communicating information, the remote stations including transmitter stations and receiver stations, each transmitter station including an information unit for producing an output information signal including data on at least one topic, and at least one light source coupled to the information unit for producing an output light signal of predetermined frequency carrying the information signal, and a coupler for coupling the light signal into the optical fiber, each receiver station including a filter for filtering light signals of at least one predetermined frequency from the light signals traveling along the fiber, and a decoder unit coupled to the filter for decoding the information signal from the modulated light signal, each light source having a different frequency and each topic of information to be carried by the optical fiber being assigned one of the frequencies, whereby the combined optical signal carried by the fiber can be filtered according to topic.

One or more of the transmitter units may be coupled to more than one light source and may disseminate information signals on more than one topic, with each topic being assigned to a respective one of the light sources and thus a respective frequency or wavelength. Similarly, one or more receiver units may have filters for filtering out signals of more than one frequency from the signal carried by the optical fiber, and splitting the filtered signals into separate signals according to their frequency, so that signals carrying information on different topics can be readily separated and further processed.

Additionally, each station in the system may include both a transmitter and a receiver unit, and the signal path in this case may be bi-directional. The system is applicable wherever different types or topics of information are to be transmitted back and forth between physically separate stations, for example where different types of sensors transmit information to processing units, such as temperature, pressure, moisture level, and the like, or in a computer network where different types of information must be transmitted back and forth between various terminals in the system. Each topic of information to be transmitted is assigned a specific light frequency or wavelength, and a light source emitting at that frequency is provided at each transmitter unit which is transmitting information under that topic, which may be one or more transmitter units in the system. At the same time, each receiver unit which is to receive information under that topic will have a filter for filtering out signals at the selected frequency from the combined signal traveling along the fiber. This allows information to be sorted readily by topic.

Alternatively, a second aspect of the present invention is a dependent or synchronous mode which provides that each transmitter station and each receiver station, some stations having both transmitter station and receiver station capabilities, has the same number (plurality) of light sources.

The transmitter station includes the plurality of light sources which correspond to each bit of the output word such that the plurality of light sources, each at separate frequencies, forms a parallel representation of an output data word. Each data bit is modulated onto the separate light frequency. The separate light frequencies are combined and coupled to the fiber.

The receiver station includes a filter which separates the respective light frequencies on the fiber. Each light frequency has a corresponding decoder to decode the corresponding data bit which, when formatted with the remaining data bits, reforms the data word.

In this dependent/synchronous mode, a separate data word of two (or more) bits is transmitted and receiver for each data cycle and the transmitted station and receiving station do not have to delay for the full two (or more) data cycles to restructure the given word. The effect of this dependent/spontaneous mode is more evident as the number of bits and number of light frequencies representing a given data word increases from two to eight to sixteen, etc.

Generally, the information unit (data processor) provides the synchronization necessary to provide its output to the couplers when and at the point in time which is in synchronization with the other bits and, as in the above independent mode, at the time when the optical fiber is in a condition to accept the generated light source.

In a hybrid structure the features and structures of the independent mode and dependent mode may be combined such that the frequencies assigned each data bit of a word of one topic are different from the frequencies assigned to each data bit of a word of a second topic. A further alternative provides a first set of enabling light frequencies which indicate that the separate light frequencies for the data bit of the data word are associated with the topic indicated by the particular enabling frequency. A further alternative provides that the light frequencies are modulated through an appropriate encryption procedure such that the data is unintelligible to someone without the proper encryption code.

In a preferred embodiment of the invention, some or all of the stations are both a transmitting station and a receiving station and the information path is duplex, allowing data to move in opposite directions back and forth between the stations. However, the system may utilize simplex transmission in which data is transmitted in one direction only between a plurality of transmitting stations and a plurality of receiving stations. The communication path may be a straight line, loop, or star arrangement as is known in the communications field. If more than one light source is provided at a single transmitter station, a mixer or combiner may be coupled to the outputs of the light sources to combine their output signals and deliver the combined signal to the optical fiber. The mixer may be any suitable mixer or combiner in the optical fiber communication field. The filters or frequency splitter may be dielectric thin film filters, diffraction gratings, dispersion prisms or the like.

Data is organized according to its function or topic, and transmitted at different wavelengths according to the specified function, and the function of the received data will thereby be recognized immediately at the receiving station, requiring no separate data sorting step. This system can therefore improve data communication efficiency.

Alternatively, data is accepted in word format with each light source frequency corresponding to a bit in a given data word. In this format, a whole data word is transmitted and received in parallel for each interface cycle substantially reducing the latency of the system due to delays for the systems to accumulate an entire word in serial fashion and reconstructing the serial word to form a data word. This alternative system substantially improves data communication efficiencies by equalizing the communication load.

According to another aspect of the present invention, a method of transmitting information between a plurality of separate stations is provided, which comprises extending at least one optical fiber along a path between the stations, the stations including transmitting stations and receiving stations, providing at least one light source at each transmitting station, at least some of the light sources having different output frequencies, assigning a predetermined topic to each different output frequency, modulating the output signal of each light source with an information signal containing information under the topic assigned to the frequency of the light source, coupling the modulated output signals of the light sources to the optical fiber, providing a filter at each receiving station for filtering out light signals of at least one of the output frequencies from the signal traveling along the fiber, and decoding the filtered signal to extract the original information signal from the modulated light signal.

Some or all of the stations may be both transmitting and receiving stations. The optical fiber may extend in a loop path, or a plurality of optical fibers may be arranged in a star shape extending from a central hub to plural remote stations.

Using this method, information relating to different topics is transmitted at different light frequencies or wavelengths, with each of the different wavelengths being assigned to a selected topic, so that the receiver does not have to sort the data. Essentially, the data sorting is performed automatically when the filters separate out the signal traveling along the fiber according to the different wavelengths, each of which will carry information for a particular assigned function or topic. The functions or topics may include source, destination, topic, location, error detection/redundancy, and so on. In a monitoring system, the topics may be temperature, pressure, humidity, and the like. This produces an efficient communication system and method.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 1 is a schematic block diagram of a communication system for transmitting information over a plurality of light wavelengths according to a first embodiment of the invention;

FIG. 2 is a schematic block diagram of a modified communication system according to a second embodiment of the invention for transmission of data over a loop path;

DESCRIPTION OF THE PREFERRED EMBODIMENT

Figure 3:
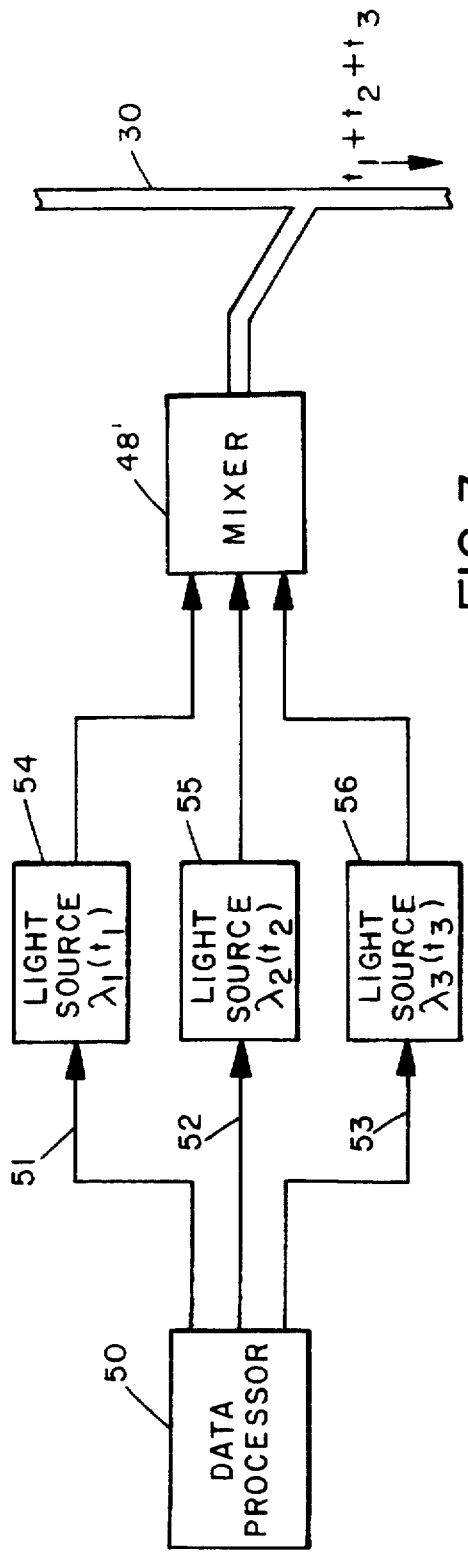
FIG. 3 is a block diagram of a transmitter of the system of FIG. 2.

FIG. 1 illustrates a simplex or simple communication system according to a first embodiment of the invention, while FIG. 2 illustrates one possible multiplex communication system according to a second embodiment of the invention. The multiplex communication system of FIG. 2 is arranged in a loop, but it will be understood by those skilled in the field that other arrangements may alternatively be used, such as a star arrangement or a bus multiplex arrangement. In the communication system of FIG. 1, a plurality of light sources (three in this case) 10,12,14 are connected to a suitable mixer 16 which mixes the output signals into a single combined output signal 18 of multiple wavelengths which is coupled into an optical fiber 20 in a manner known in the field. Each light source is of a different wavelength $\lambda_1$, $\lambda_2$, $\lambda_3$. In the illustrated embodiment, three light sources are used although as few as two or as many as available may be used in alternative embodiments, depending on the application. Each light source is modulated according to the data to be transmitted at that wavelength, by a suitable control input or electrical signal carrying the desired information from a data processor or computer to the respective light source. Each light source wavelength or frequency is assigned one function or topic of information to be transmitted, so that all information under a first topic $t_1$ is provided in a first signal to modulate the output of light source 10, all information under a second topic $t_2$ is provided in a second signal to modulate the output of light source 12, and all information under a third topic $t_3$ is provided in a third signal to modulate the output of light source 14. As noted above, as few as two (FIG. 1 shows three) light sources may be provided, dependent on the number of different functions or topics for which information is to be transmitted over the network or system.

Any suitable light sources for producing output light signals at wavelengths suitable for transmission over an optical fiber may be used, such as semiconductor lasers and light emitting diodes. Generally each light source is monochromatic at a designated wavelength.

The mixed light signal propagating along optical fiber 20 is received by a suitable light filter (splitter) device 22 coupled to the optical fiber at a location remote from the input end of the fiber. The filter may be any suitable device for splitting a signal of several different wavelengths, and thus frequencies, into separate signals at the individual wavelengths. Device 22 may be a dielectric thin film filter, a diffraction grating, or a dispersion prism, for example, or any other suitable beam splitting device. The separated optical signals are input to a plurality of detectors or decoders 24,25,26, each arranged to receive light at one of the selected wavelengths or frequencies. Any suitable optical detector such as PIN photodiodes or avalance photodiodes may be used. Each detector produces an electrical output signal carrying the same information as the input optical signal, and the output signals of the respective detectors are connected to suitable signal processing equipment, such as a data processor or computer, for further processing. Since the signals are already separated according to topic, the computer does not have to sort the data but can simply operate on each set of data as appropriate. The various functions or topics may be broadly designated according to data source, data location, data destination, subject matter, error detection/redundancy, and so on; or it may be specifically designated such as financial data, temperature data, sales information and so on.

The allocation of topical information to an available frequency (wavelength) defines a system protocol which is integrated into and becomes a basic complement of the data processing and communication system. Topical information includes any set of information that has a common feature or set of features which are usable for segregating information due to the operating objectives and purposes of the data processing equipment. Examples of the identification and selection of information into topical areas includes the examples identified in Table 1. Those skilled in the art would be able to designate and identify other categories. Table 1 is a just a listing of examples or sample information and is not intended to be a complete listing of all possibilities. The concept of this invention extends to any information having common features or even sets of common features consistent with the operating objectives of the host system, data processing system or communication system.

TABLE 1

TOPIC DESIGNATIONS (Examples)

| Topic | Information |
|---|---|
| I | Information associated with a given source or transmitter station |
| II | Information associated with a given destination or receiver station |
| III | Business information, such as financial or sales information |
| IV | Environmental data, such as temperature, pressure, wind direction, wind velocity, etc. |
| V | Digitized telephonic information, such as Internet data, modem data, fax data |
| VI | Voice telephone information; analog or digital |
| VII | Security information, such as data redundancy and encryption |

FIG. 1 illustrates a simplex transmission path, in which data is transmitted in one direction only from a transmitter at one end of the fiber to receiving equipment at the opposite end of the path. However, most communications requirements are more complex than this, and require data transfer back and forth between more than two different stations. Such systems are known as multiplex transmission systems. FIG. 2 illustrates one example of a multiplex transmission system according to a second embodiment of the present invention. In this example the transmission path is a loop, although it may alternatively be a star or bus multiplex arrangement, as will be understood by those skilled in the field.

Fundamental to this invention is the feature that separate monochromatic light frequencies (infra-red to ultra-violet) do not interfere with each other when being transmitted through a fiber. Each frequency is separate, independent and does not interfere with other frequencies. The number of available frequencies is limited only by the ability to generate separate monochromatic light frequencies and the ability of the filter or split the frequencies sufficient to resolve a given frequency whereby to decode the information.

In the system of FIG. 2, one or more optical fibers are arranged in a loop path 30. Arranged along the path are a plurality of stations, including transmitter stations 32 and receiver stations 34; these stations may be organized in any sequential arrangement. Although each station in FIG. 2 is shown as either a transmitter or a receiver, for simplicity, it will be understood by those skilled in the field that each station may be both a transmitter and a receiver, for transmitting information to other stations and receiving information back from other stations. In this case, each station will include the components of both a transmitter station 32 and a receiver station 34.

Each transmitter station or unit 32 includes a device 36 which produces an electrical output data signal 38 carrying information on at least one topic, and at least one light source 40 linked to device 36 for producing an output light signal 42 modulated by data signal 38. Device 36 may be a data processing unit or computer in a computer network, for example, or may be a sensor in a security system or other monitoring system. Some or all of the transmitter units 32' may include more than one light source. In this case, the device 36 produces output signals 39,46 carrying information on two or more different topics or functions, with output signal 39 connected to light source 41 and output signal 46 connected to light source 44. The number of light sources at each transmitter unit will be equal to the number of different topics or types of information to be transmitted from that unit. The light sources will be of different frequencies and wavelengths, and each light frequency is assigned to a different topic of information to be transmitted by the system. Where a single transmitter unit is associated with more than one topic and thus more than one light source, the light sources will preferably be connected to a suitable combiner or mixer unit 48 for combining the different light signals and providing the combined light signals to the optical fiber 30. Where a single light source is provided, the output signal will be suitably coupled to fiber 30 in a manner known in the field. Where two or more transmitter units are transmitting information on the same topic, they will be associated with light sources having the same output frequency.

The information can be modulated onto the light signal of a given frequency by any known means or method. The possible modulation techniques include digital and analog techniques. Data rates and modulation techniques for each frequency include all currently available and used techniques for transmitting data and information over fiber optic monochomatic light communication systems.

FIG. 3 illustrates one example of a transmitter unit in more detail. In this case the transmitter unit comprises a data processor or computer 50 producing output signals 51,52,53 relating to three different topics $t_1$, $t_2$, $t_3$. These signals are input to three different light sources 54,55,56 having different output frequencies or wavelengths. The light sources are connected to mixer or combiner 48', which in turn is coupled to fiber 30 to transmit signals at the three different frequencies along the fiber.

As shown in FIG. 2, each receiver unit 34 includes a filter 58 for filtering out signals at one or more selected frequencies from the combined signal traveling along the optical fiber 30. The frequencies to be filtered out at any particular receiver unit will be dependent on the topics of information to be delivered to that receiver. The output of filter 58 is connected to a suitable decoder or detector 60 for converting the modulated optical signal back to an electrical signal corresponding to the original information or data signal. The decoded signal may be provided to a data processor or the like in the usual manner. The techniques for filtering and demodulating light signals in fiber optical systems are well known in the field and therefore will not be described in detail here. Each receiver unit may be designed to receive information on only one topic or on more than one topic, and the filter will be set up depending on the frequency or frequencies assigned to the topic or topics to be delivered at that receiver.

Figure 4:
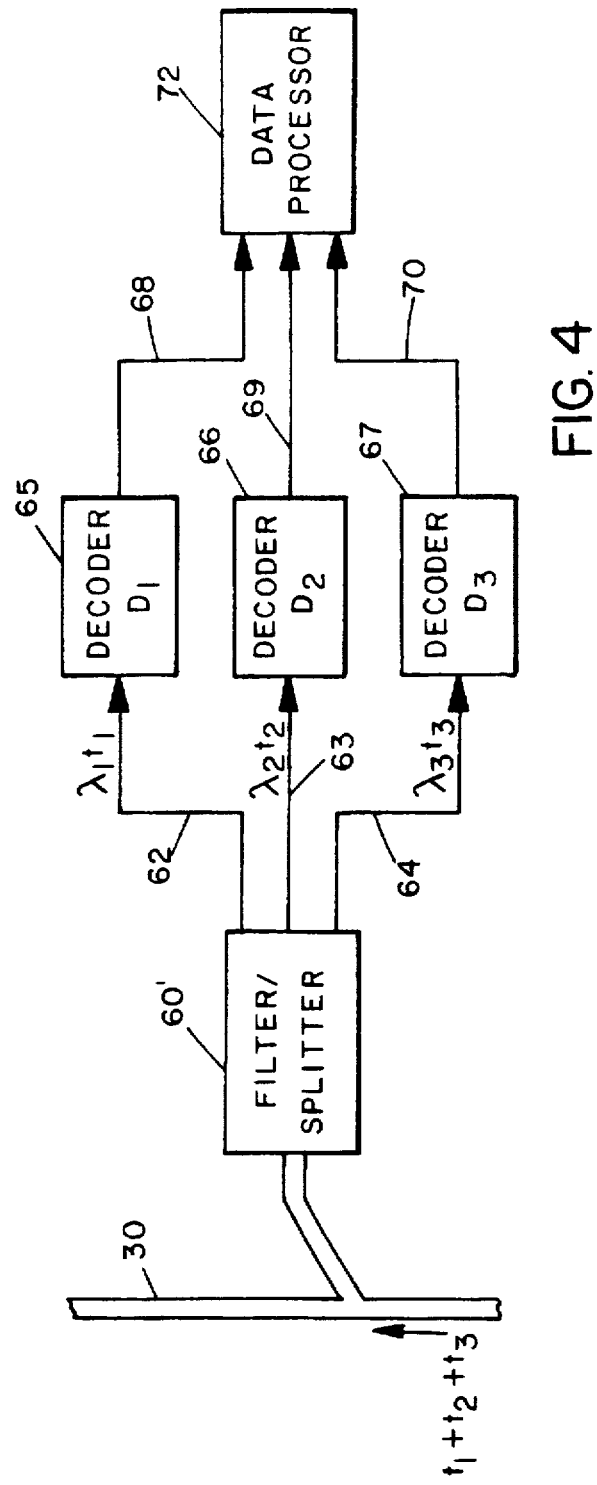
FIG. 4 is a block diagram of a receiver in the system of FIG. 2.

FIG. 4 illustrates a receiver unit for receiving signals carrying information on three different topics $t_1$, $t_2$, $t_3$. In this case, the filter 60' filters out from the signal traveling along fiber 30 all parts of the signal which are at the three frequencies of interest. The separated signals 62,63,64 are connected to the inputs of three decoders or detectors 65,66,67, which each produce an output electrical signal 68,69,70 carrying the same information which was carried by the light signal at that frequency. The output signals may be connected to a data processor or computer 72 for further processing, for example.

In this system, each topic of information to be transmitted is assigned a predetermined light frequency, and light sources are provided at all the assigned frequencies. The frequency of a light source coupled to any transmitter station in the system will be dependent on the frequency assigned to the topic or function on which data is transmitted from that station. If a station transmits data on more than one topic, which will often be the case, it will be coupled to one light source for each topic, with the light source frequency being selected according to the previously assigned frequency for that topic. Note, each frequency has an associate topic but a given topic may include a wide range of informational categories.

After the information has been assigned to a given Topic, each Topic is then allocated to and associated with an available monochromatic light at a specified Frequency (or wavelength). Table 2 shows a typical allocation chart of Topic to Frequency. To maintain maximum bandwidth and data throughput, the allocation table should be defined to equalize the use of the frequencies used throughout the system.

TABLE 2

ALLOCATION TABLE

| Topic | Frequency | | | | | |
|-------|---|---|---|---|---|---|
|       | 1 | 2 | 3 | 4 | 5 | 6 |
| I     |   | X |   |   |   |   |
| II    | X |   |   |   |   |   |
| III   |   |   | X |   |   |   |
| IV    |   |   |   |   |   |   |
| V     |   |   |   |   |   |   |
| VI    |   |   |   |   |   |   |
| VII   |   |   |   |   |   |   |

The advantage of this arrangement is it allows information to be transmitted at different frequencies on the same optical fiber link, while permitting the data to be separated readily according to topic, by assigning each topic to a specific light frequency. This provides increased band width, information carrying capacity, and efficiency with increased ease and efficiency in resolving the information by topic.

In an alternative structure, each transmitter station (FIG. 3) and each receiver station (FIG. 4) includes the same number of independent light sources 54,55 and 56 with their respective light source wavelengths $\lambda_1$, $\lambda_2$ and $\lambda_3$ to represent the separate information of each data bit $t_1$, $t_2$ and $t_3$. Table 3 shows a typical allocation of the data word to frequency allocation. Specifically, this table demonstrates the bit position the data maintained at that bit position and the frequency allocation.

TABLE 3

DATA WORD - FREQUENCY ALLOCATION

|           | Bit position | | | | |
|-----------|---|---|---|---|---|
|           | 1 | 2 | 3 | 4 | ... |
| Data      | $t_1$ | $t_2$ | $t_3$ | $t_4$ | ... |
| Frequency | $\lambda_1$ | $\lambda_2$ | $\lambda_3$ | $\lambda_4$ | ... |

FIG. 3 shows a representation of the transmitter station for a 3-bit data word where the data processor 50 conditions the output into a 3-bit word. Those skilled in the art can readily see that any plurality of bits to a data word is possible. In FIG. 3, bit 1 is connected to light source 54 which modulates the date onto the light source generating a light source at a wavelength $\lambda_1$. Similarly, bits 2 and 3 are connected respectively to light source 55 and 56 having light source wavelengths $\lambda_2$ and $\lambda_3$ respectively.

As is also provided by the data processor, as with reference to the independent mode of the first aspect of the present invention, the data processor in this dependent and synchronous mode for the second aspect of the present invention provides the 3-bit data output word to the light source generators 54,55 and 56 at the proper time such that the fiber 30 is in a condition to accept and accommodate the data word. Further, in this dependent and synchronous mode of the second aspect of the present invention, the data processor 50 also provides or has means for providing the timing and control such that all bits of the data word are provided in parallel and in synchronization to the light source generators 54,55 and 56. Each light source 54,55 and 56 transmits its light signal to mixer 48. The light sources are combined in mixer 48 which is in turn coupled to fiber 30.

FIG. 4 illustrates a 3-bit data word receiving station for receiving light signals corresponding to information in a 3-bit data word. The filter/splitter 60' separates the wavelengths $\lambda_1, \lambda_2$ and $\lambda_3$ which carry the information for bit 1, bit 2 and bit 3. $t_1, t_2$ and $t_3$ respectively. The separate light signals 62,63 and 64 are connected to decoders 65,66 and 67 which produce output electrical signals 68,69 and 70. The output electrical signals 68,69 and 70 are connected to data processor 72 which inputs the signals 68,69 and 70 as a 3-bit data word having $2^3$ or eight possible data states. As is clear to those skilled in the art, a separate 3-bit word is transmitted and received for each interface cycle. Data words of greater width (8, 16, etc.) demonstrate an even greater effect of this transmittal of information.

This architecture enables a separate data word to be transmitted and received each interface cycle as opposed to delaying the reception of a data word for three cycles to collect the three bits of serial information to form a data word and then require the data process unit to operate on three words simultaneously. This architecture substantially equalizes the load on the data processor and reduces the latency of the overall system.

Although a preferred embodiment of the invention has been described above by way of example only, it will be understood by those skilled in the field that modifications may be made to the disclosed embodiment without departing from the scope of the invention, which is defined by the appended claims.

I claim:

1. An optical fiber communication system, comprising:

at least one optical fiber extending over a desired communication path;

a plurality of remote stations each linked to the optical fiber for communicating information, the remote stations including a plurality of transmitter stations and a plurality of receiver stations;

each transmitter station including an information unit for producing an output information signal including data on at least one topic, at least one signal path connected to the output of the information unit, a single light source in said signal path coupled to the information unit for producing an output light signal of predetermined frequency carrying the information signal, and a coupler for coupling the light signal into the optical fiber, each of the signal paths and light sources being separate from any other signal paths and light sources in the transmitter station;

each receiver unit including a filter for filtering light signals of at least one predetermined frequency from the light signals traveling along the fiber, and a decoder unit coupled to the filter for producing the information signal from the modulated light signal;

at least some of the light sources having different frequencies; and each topic of information to be carried by the optical fiber being assigned to one of said frequencies, whereby the combined optical signal carried by the fiber can be filtered according to topic.

2. The system as claimed in claim 1, wherein at least one of said transmitter units includes a plurality of different signal paths connected to the output of the information unit, and a plurality of different light sources of different frequencies, each light source being located in a respective one of the signal paths, said information unit comprising means for producing separate information signals for each of a plurality of different topics, and for coupling each information signal to a respective one of said light sources at the frequency assigned to the respective topic.

3. The system as claimed in claim 2, wherein at least one of said receiver units has a filter for filtering out signals of more than one frequency from the signal carried by the optical fiber, and splitting the filtered signals into separate signals according to their frequency.

4. The system as claimed in claim 1, wherein at least some remote stations are combined transmitter and receiver stations including a transmitter unit and a receiver unit.

5. The system as claimed in claim 1, wherein the communication path is a star shape.

6. The system as claimed in claim 1, wherein the communication path is linear.

7. The system as claimed in claim 1, wherein light sources of at least four different frequencies are provided.

8. The system as claimed in claim 7, wherein the topics of information assigned to the respective frequencies include source, destination, location, and subject matter.

9. The system as claimed in claim 8, wherein the topics further include error detection information.

10. An optical fiber communication system comprising:

at least one optical fiber extending over a desired communication path, the communication path being a loop;

a plurality of remote stations each linked to the optical fiber for communicating information, the remote stations including at least one transmitter station and at least one receiver station;

each transmitter station including an information unit for producing an output information signal including data on at least one topic, at least one light source coupled to the information unit for producing an output light signal of predetermined frequency carrying the information signal, and a coupler for coupling the light signal into the optical fiber;

each receiver unit including a filter for filtering light signals of at least one predetermined frequency from the light signals traveling along the fiber, and a decoder unit coupled to the filter for producing the information signal from the modulated light signal;

at least some of the light sources having different frequencies; and each topic of information to be carried by the optical fiber being assigned to one of said frequencies, whereby the combined optical signal carried by the fiber can be filtered according to topic.

11. A method of transmitting information between a plurality of separate stations, comprising the steps of:

extending at least one optical fiber along a path between a plurality of spaced stations, the stations including transmitting stations and receiving stations;

providing at least one signal path at each transmitting station, locating a single light source in each signal path separate from all other light sources in the transmitting station, at least some of the light sources having different output frequencies;

assigning a predetermined topic to each different output frequency, each topic being different from the topics assigned to at least some of the other output frequencies;

modulating the output signal of each light source with an information signal containing information under the topic assigned to the frequency of the respective light source;

coupling the modulated output signals of the light sources to the optical fiber;

providing a filter at each receiving station for filtering out light signals of at least one of the output frequencies from the signal traveling along the fiber; and decoding the filtered signal at each receiving station to extract the original information signal from the modulated light signal.

12. The method as claimed in claim 11, including the step of providing at least some combined transmitter and receiver stations for transmitting information signals along the fiber and receiving information signals from other stations from the fiber.

13. The method as claimed in claim 11, including the steps of transmitting information on a plurality of different topics from at least one of said transmitter stations, providing a plurality of light sources of different frequencies at said one transmitter station, the number of light sources being equal to the number of topics to be transmitted at said one transmitter station, and connecting the light sources at said one transmitter station to a mixer unit for combining the output signals of the light sources and providing the combined signal to the fiber.

14. The method as claimed in claim 11, including the steps of receiving information on a plurality of different topics at least one first receiver unit, the filter at said first receiver unit comprising means for filtering out and separating signals at the frequencies assigned to the topics of said first receiver unit, and decoding the respective separated signals to produce output information signals on the respective topics.

15. An optical fiber communication system comprising:

at least one optical fiber extending over a desired communication path; and a plurality of remote stations, each linked to the optical fiber for communicating information, remote stations including at least one transmitter station and at least one receiver station;

each transmitter station including an information unit for producing an output data word, the output data word having a plurality of data bits, each data bit of the output data word coupled to a separate one of a plurality of light sources, each separate light source having a separate predetermined light frequency for carrying the information of the coupled data bit, each light source modulates the information of the respective data bit onto the respective signal light source to form a bit light signal and a coupler for coupling the plurality of bit light signals onto the optical fiber;

each receiver station including a light filter connected to the optical fiber for separating the plurality of predetermined light frequencies of bit light signals and a plurality of separate decoder units each separately optically connected to demodulate each of the plurality of separate light frequencies to provide a respective plurality of data bit information signals to reform the output data word.

* * * * *